United States Patent

[11] 3,533,323

| [72] | Inventor | Ellsworth H. Baxter<br>Erie, Pennsylvania |
|---|---|---|
| [21] | Appl. No. | 519,729 |
| [22] | Filed | Jan. 10, 1966 |
| [45] | Patented | Oct. 13, 1970 |
| [73] | Assignee | Louis Marx and Co., Inc. |

[54] MUSICAL TOY
5 Claims, 6 Drawing Figs.

[52] U.S. Cl. .................................................. 84/102,
84/404, 46/216, 46/177
[51] Int. Cl. .................................................. A63h 19/00,
A63h 21/00
[50] Field of Search.......................................... 84/102,
402, 403, 404; 104/60; 46/111, 112, 113, 177,
216, 217, 218; 238/2, 6, 10, 11, 12

[56] References Cited
UNITED STATES PATENTS

| 1,544,512 | 6/1925 | Weiss .......................... | 46/174 |
| 1,887,506 | 11/1932 | Hafner ........................ | 46/113 |
| 2,089,885 | 8/1937 | Fisher.......................... | 46/99 |
| 2,883,793 | 4/1959 | Crawford .................... | 46/99 |

Primary Examiner—Richard B. Wilkinson
Assistant Examiner—George H. Miller, Jr.
Attorney—Blum, Moscovitz, Friedman, Blum and Kaplan ABSTRACT: A musical toy railroad comprising a track composed of sound emitting bodies, toy vehicle moving along said track and striking said sound emitting bodies during movement along said track so as to play a tune.

Patented Oct. 13, 1970

INVENTOR.
ELLSWORTH H. BAXTER

BY

ATTORNEYS

INVENTOR.
ELLSWORTH H. BAXTER

BY

ATTORNEYS

Patented Oct. 13, 1970

MUSICAL TOY

TOY

The present invention relates to toys.

In particular, the present invention relates in part to that type of toy in which musical sounds are produced by striking against sound-producing elements capable of producing various musical tones when struck. Thus, the invention relates in part to musical toys of the xylophone-type.

With toys of this general type there is a certain amount of drudgery experienced, particularly by extremely young people, in learning to play various songs. On the other hand, extremely simple musical toys, such as music boxes and the like, become very boring after awhile inasmuch as they can only repeatedly play a single tune.

Other types of toys soon become a source of boredom also, even for the very young. For example, a toy vehicle which moves repeatedly along a given track will not be entertaining for very long, even to an extremely young person.

It is accordingly a primary object of the present invention to provide a musical toy which can be played with a minimum amount of drudgery.

Furthermore, it is an object of the invention to provide a musical toy which lends itself to the playing of different melodies, so that even a relatively young person can select different songs to be played.

Furthermore, it is an object of the invention to combine the features of a musical toy with the features of a toy vehicle moving along a given track in such a way that the part of the toy which involves the movement of a vehicle along a track is enhanced by the musical sounds while the musical sound-producing part of the structure is rendered more entertaining because of its combination with a toy vehicle moving along a given track.

In addition, it is an object of the invention to provide a toy of the above general type which can easily be broken down so as to be stored in a minimum amount of space while at the same time being quickly and rapidly set up for operation.

Also, it is an object of the invention to provide a toy of this type which is quite simple to operate and which will operate reliably.

Furthermore, it is an object of the invention to provide a musical toy which lends itself to easy changes for the purpose of providing different selected musical compositions to be played by the musical toy.

Primarily with the invention there are a plurality of sound-producing elements capable of being arranged in a given sequence for producing a predetermined sequence of musical tones when struck in the given sequence. A support means supports these sound-producing elements in the selected sequence along a given path, and a guide means is coextensive with this path and guides a moving means for movement along the latter path. This moving means carries a striking means which strikes against the sound-producing elements as the moving means moves along the predetermined path so that in this way the elements are struck in a sequence which will produce a selected combination of musical tones.

The invention is illustrated by way of example in the accompanying drawings which form part of the application and in which.

Figure 1:
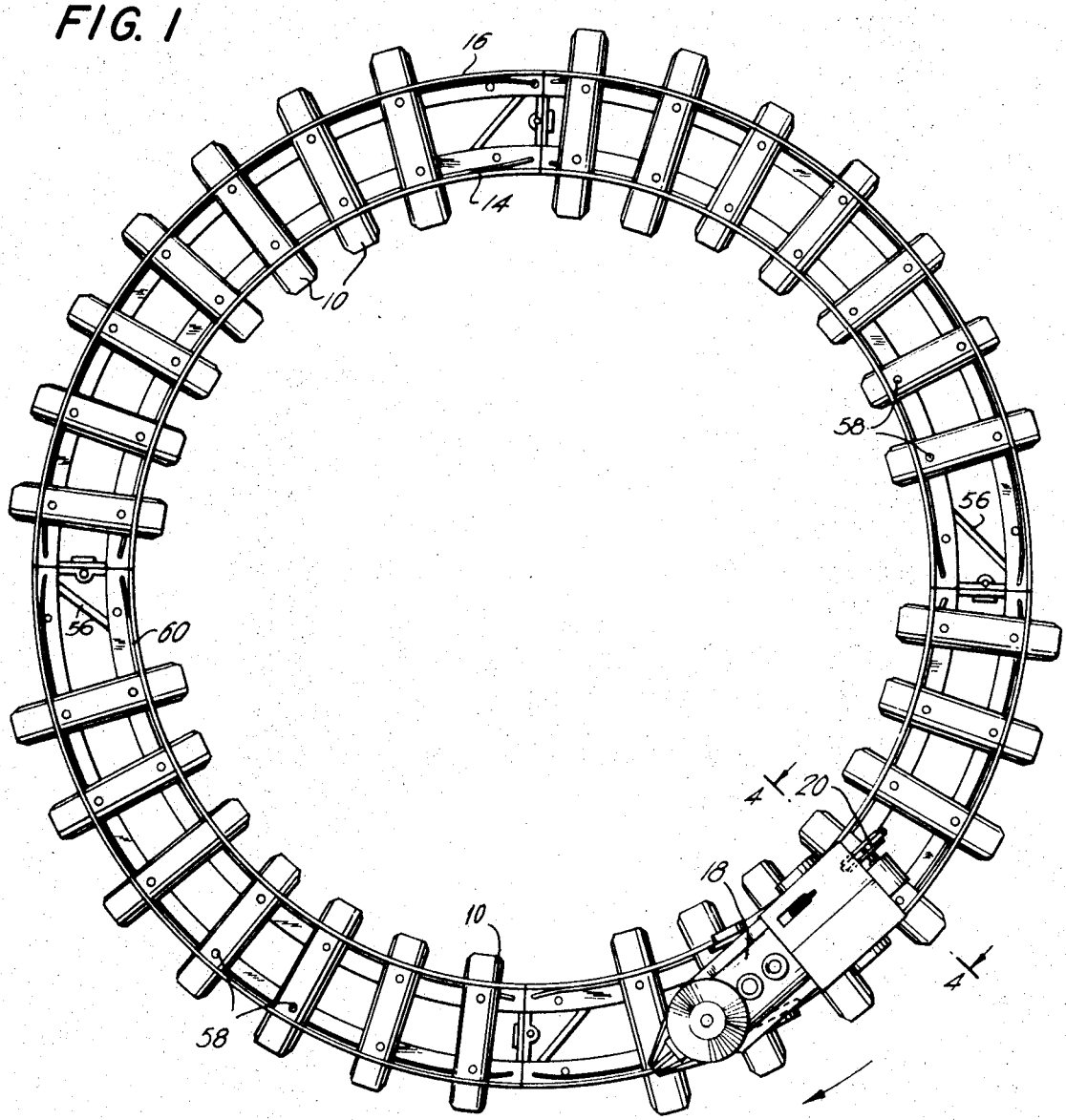
FIG. 1 is a top plan view of one possible embodiment of a toy according to the present invention.
Figure 2:
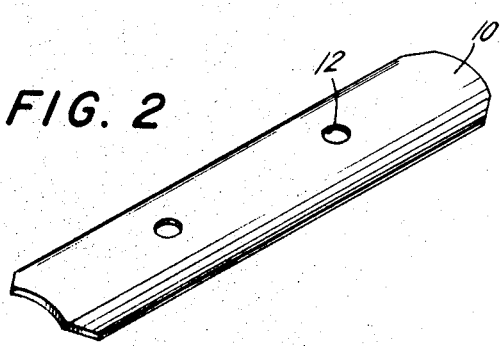
FIG. 2 is a perspective illustration, at an enlarged scale as compared to FIG. 1, of one of the plurality of sound-producing elements used in the toy of the invention.

Referring now to FIG. 1, the toy illustrated therein includes a plurality of sound-producing elements 10. As may be seen from FIG. 2, the sound-producing elements 10 are in the form of elongated bars which have upper convex and lower concave surfaces and which are formed between their ends with a pair of openings 12. These bars are of the type used in toy xylophones, for example, and they are capable of producing musical tones when struck with any suitable impact instrument. The several elements 10 will have somewhat different lengths for producing the different musical tones, and they are color-coded so that the operator can select the different tones according to the colors of the elements 10. Thus, it will be seen that the various elements 10 of FIG. 1 are designated by several letters B, G, Y, R, indicating the colors blue, green, yellow, red, etc., so that by choosing bars of various colors which are in correspondence with the different lengths of the bars, respectively, it is possible for the operator to select various musical tones.

A support means supports the elements 10 in a given sequence along a given path, and in the example of FIG. 1 the path is endless and circular. As will be apparent from the description below the various elements 10 are removably carried by the support means so that they can be removed and replaced thereon in a given sequence to provide a selected musical composition.

A guide means is coextensive with the path along which the elements 10 are arranged, and this guide means includes, in the illustrated example, an inner circular rail 14 and a concentric outer circular rail 16 simulating a railroad track. A moving means is guided for movement along the guide means formed by the track 14, 16 and in the illustrated example this moving means takes the form of a vehicle-simulating toy 18. This vehicle-simulating toy is a toy locomotive, thus forming a component of a toy train which is capable of moving along the track 14, 16. This vehicle-simulating toy 18 carries a striking means 20 which strikes against the several elements 10 in the sequence in which they are arranged on the support means, so as to provide a given sequence of musical tones which will cause the toy to play a selected musical composition.

Figure 3:
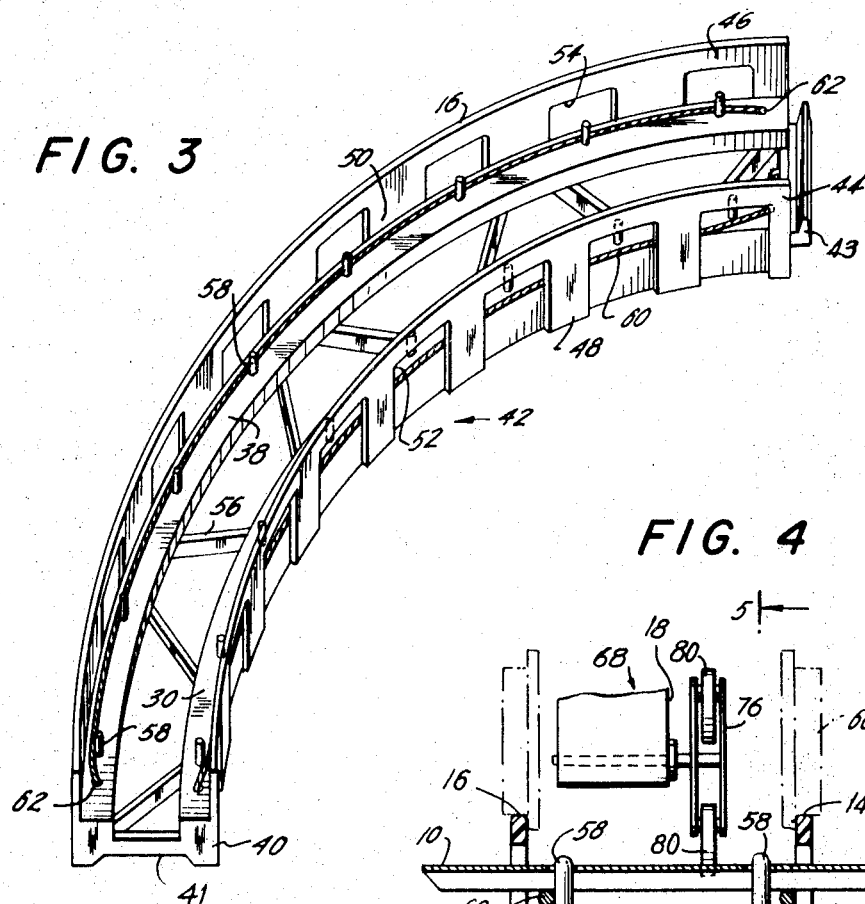
FIG. 3 is a perspective illustration of a section of a support means and guide means of the invention.
Figure 4:
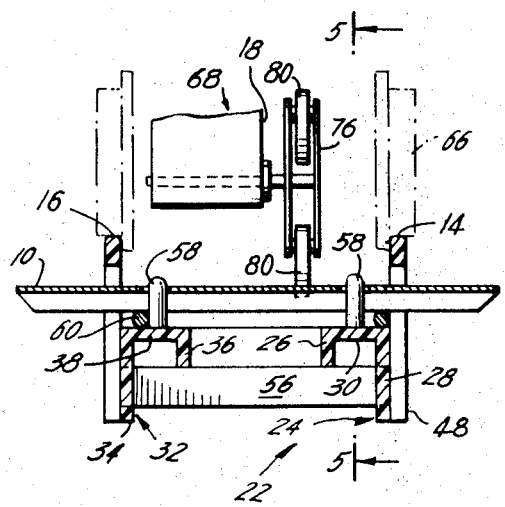
FIG. 4 is a transverse section taken along line 4—4 of FIG. 1 in the direction of the arrows.
Figure 5:
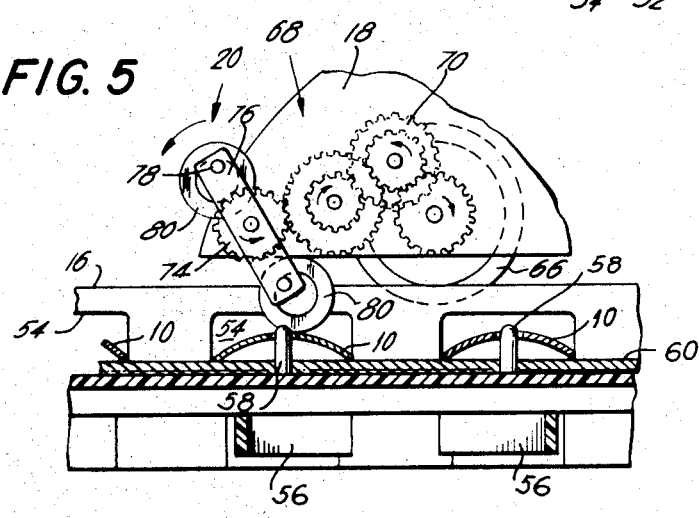
FIG. 5 is a fragmentary longitudinal section taken along line 5—5 of FIG. 4 in the direction of the arrows.

The details of the toy shown in FIG. 1 are illustrated further in FIGS. 3—5.

Thus, referring to FIGS. 3—5, the support means 22 includes an inner, plastic supporting element 24 of channel-shaped configuration having an outer wall 26 which is shorter than its inner wall 28 and having a top transverse wall 30, as is apparent from FIG. 4. The support means 22 further includes an outer support element 32 having an outer wall 34 and an inner shorter wall 36 connected to the outer wall by a transverse wall 38. The walls 26, 28, 30 of the channel element 24 as well as the walls 34, 36, 38 of the outer channel element 32 extend in the illustrated example only along an angle of 90° to form part of the section of the support and guide means illustrated in FIG. 3. The ends of the channel members 32 and 24 are closed by integral end plates 40 one of which is visible at the lower end of FIG. 3 and formed with a dovetail groove 41. The other end plate has a mating dovetail projection 43 to be received in the groove 41 of the adjacent section. These stepped end plates having the configuration shown in FIG. 3 are situated at the opposed end of each section 42, and the several sections of which there are four, are arranged in end-to-end relation to form the endless circular assembly illustrated in FIG. 1. Self-tapping screws may be threaded through the abutting end walls of adjoining sections for retaining the sections in assembled relation.

The tracks 14 and 16 of the guide means are formed by the upper edges of plastic circular sections 44 and 46 which are castellated so as to have downwardly directed legs 48 for the inner section 44 and downwardly directed legs 50 for the outer section 46, as is most clearly apparent from FIG. 3. Thus, the castellations formed by the legs 48 and 50 will provide for each of the sections 44 and 46 of the guide means a series of openings 52 and 54, and the openings 52 are respectively aligned with the openings 54. All of these openings are wide enough to permit the elements 10 to pass freely therethrough in the manner shown in FIGS. 4 and 5. The legs 48 and 50 are preferably integral with the walls 28 and 34, so as to form one-piece integrally molded track sections.

The channel elements 24 and 32, in addition to being interconnected by the integral end walls 40, are interconnected by transversely extending integral braces or struts 56 extending at various angles, as is apparent from FIG. 3. These braces 56 are integrally molded at their ends to the longer walls 28 and 34 of the channel elements 24 and 32, and it is to be noted that the upper edges of the elements 56 engage the lower edges of the inner walls 26 and 36, as is clearly apparent from FIG. 4.

In order to determine the locations of the sound-producing elements 10 on the support means 22, the walls 30 and 38 of the channel elements 24 and 32, respectively, fixedly carry upwardly directed pins 58 which can be fixed in any desired manner to the channel elements as by being formed integrally therewith, for example. These pins 58 are thus arranged along two circular rows in the manner clearly apparent from FIGS. 1 and 3. The outer row of pins 58 are respectively aligned with the outer openings 54 while the inner row of pins 58 are respectively aligned with the inner openings 52. Moreover, the top ends of the pins 58 are substantially lower than the upper limits of the openings 52 and 54, as is clearly apparent from FIG. 5. Therefore, it is a simple matter for the operator to slip the musical sound-producing elements 10 through the aligned pairs of openings 52 and 54 so that the openings 12 will become aligned with the aligned pairs of pins 58 to receive the latter in the manner shown most clearly in FIGS. 4 and 5, and in this way the several elements 10 are removably carried by the support means 22.

However, during striking against these elements 10 with the striking means described below, these elements 10 are set into vibratory motion while they produce the musical tunes and therefore resiliently and yieldably supporting means 60 is provided for the elements 10 on the support means. These elastic filaments 60 may take the form, for example, of fine elongated rubber yarns or yarns of other suitable stretchable material arranged in bundles within a suitable stretchable sheath, for example. Whatever the construction of the elastic filaments 60, in the illustrated example their free ends pass through openings 62 (FIG. 3) formed in the walls 30 and 38 of the support means, and beneath these walls the free ends of the elastic elements 60 are knotted so that they cannot pass upwardly through the opening 62. These elastic filaments 60 are knotted while they are under some tension when stretched along an outer row of pins 58 engaging the outwardly directed surfaces thereof, as indicated in FIG. 3. Thus, each of the sections 42 will have, as shown in FIG. 3, a pair of elastic filaments 60. The outer filaments 60 will extend along the outer row of pins 58 engaging the outwardly directed surfaces thereof, while the inner element 60 will extend along the inner row of filaments 58 but will press against the legs 48 because of the tendency of the stressed elements 60 to assume the configuration of a straight line.

With this construction the operator, when introducing the elements 10 into the assembly so as to assume the positions such as that shown in FIGS. 4 and 5, places them on the elastic filaments 60 so that after the elements 10 are situated on the support means the elastic elements 60 will resiliently support the elements 10 for proper resonance. Thus, through this simple structure it is possible for the operator to remove and replace the elements 10 so as to arrange them in any desired sequence.

As is shown in FIGS. 4 and 5, the toy vehicle 18 has wheels 66 which ride along the tracks 14 and 16. A drive means shown in FIG. 5 is provided for driving the vehicle, and this drive means 68 can include any suitable spring motor driving the gear transmission 70 shown in FIG. 5 and operatively connected with the rear wheels 66 of the toy vehicle so as to advance the latter along the track.

In accordance with a further feature of the present invention this drive means 68 also serves to drive the striking means 20. This striking means 20 is in the form of a spinner and includes a rotary shaft 72 supported for rotation in any suitable bearings and carrying a gear 74 driven from the drive means 70 in the manner shown in FIG. 5, so that in the illustrated example the shaft 72 and the gear 74 will rotate together in a counterclockwise direction, as viewed in FIG. 5. The rotary shaft 72 fixedly carries a pair of coextensive parallel bars 76 which are spaced from each other and which fixedly support at their outer ends transverse pins 78 on which impact rings 80 are mounted with considerable clearance as indicated in FIG. 5. These impact rings 80 may take the form of simple washers through which the pins 78 respectively pass with clearance on the order indicated in FIG. 5, and the distance of the shaft 72 from the upper surfaces of the several elements 10 is such that the elements 80 will strike against and ride along the elements 10 during rotation of the shaft 72 together with the bars 76. Thus, with this construction the striking means 20 will strike against the several elements 10 in the sequence in which they are arranged along the support means 22.

In order to store the toy the vehicle is readily lifted from the guide means 14, 16, and the several sections 42 are readily separated from each other so that the entire toy can be stored in a small space. It is set up with equal rapidity and convenience.

Figure 6:
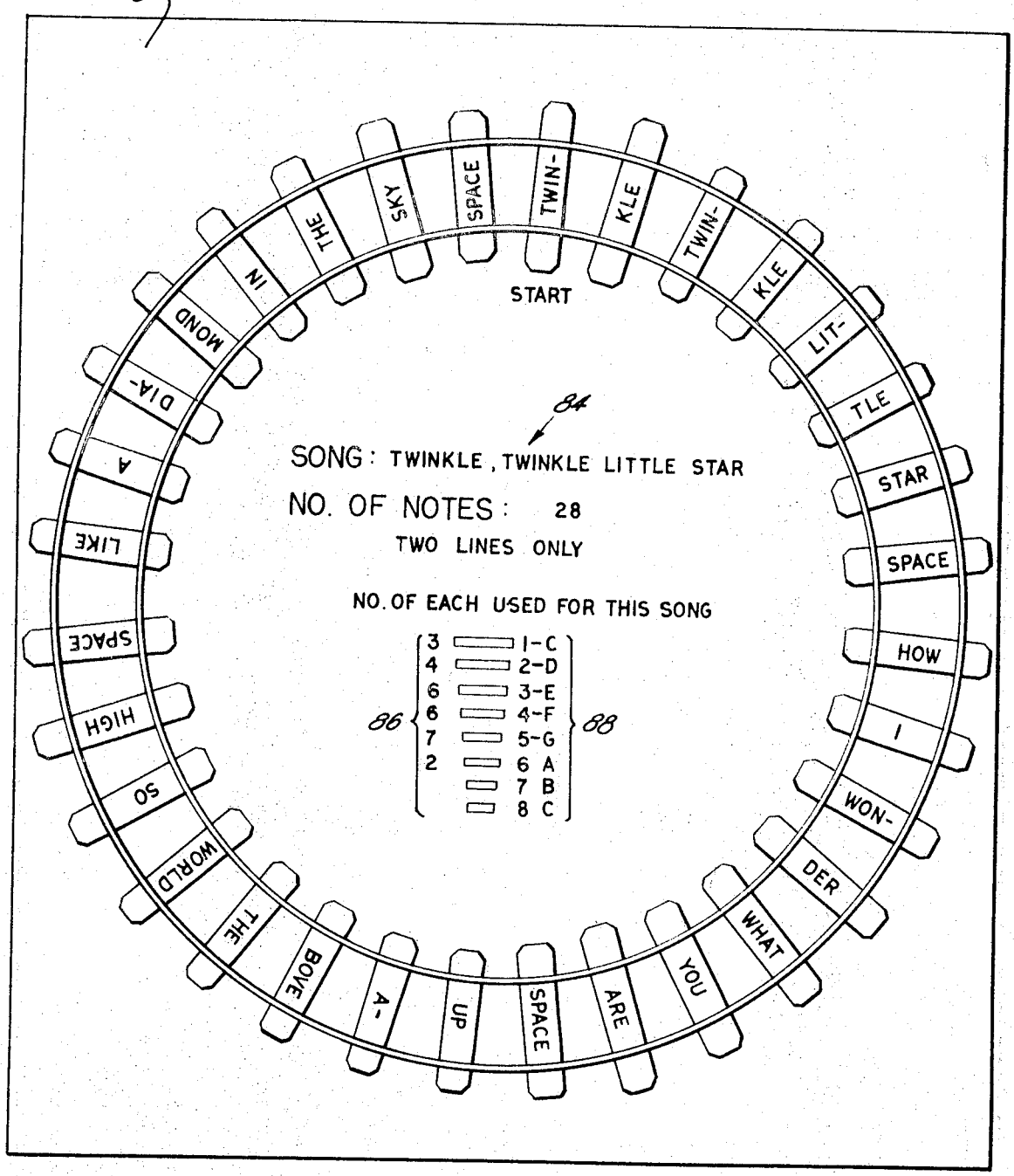
FIG. 6 is an illustration of one of a series of sheets referred to by the operator for the purpose of setting up the toy to play a given musical composition.

In order to play a selected composition the operator will have a series of sheets such as the sheet 82 shown in FIG. 6. This sheet will have imprinted thereon instructions as to how to set the toy up. Thus it will be seen that the sheet 82 of FIG. 6 includes a title 84 of a particular song together with the number of notes required, so that the operator will know how many elements 10 are required. These elements 10 will be selected from a suitable supply of these elements in a number and type as indicated by the code 86. This code shows the number of each type of element 10 required as well as the various types according to color. For this purpose the various elements 10 are indicated on the sheet 82 in the various colors next to the numbers thereof which are required according to the code 86. The row of indicia 88 shown to the right of the elements 10 indicated on the sheet 82 indicate the various musical notes which will be produced so that to some extent instruction in music can also be achieved from the toy of the invention.

The operator will then set the elements 10 on the support means according to the sequential arrangement indicated in the sheet 82 where various colored elements 10 are shown arranged in a given sequence with the words of the song corresponding to the musical tones which will be produced by the elements 10 when they are arranged in the sequence shown in FIG. 6 and struck in this sequence. These elements 10 are quickly set up by being passed through the aligned openings 52 and 54 onto the pins 58, and elastic elements 60. Once the elements are set up in the manner shown in FIG. 6, the operator sets the moving means formed by the vehicle 18 on the guide means formed by the rails 14 and 16 and winds the spring motor which may form part of the toy vehicle, or simply closes a switch in the event that it is battery driven, for example. In either event the drive means will not only drive the toy vehicle along the path determined by the guide means 14, 16 but in addition this drive means will operate the striking means 20 so that the impact rings 80 will successively strike against the series of elements 10 arranged in the predetermined sequence to provide not only the entertainment of a toy vehicle moving along a track but also the entertainment of reproduction of a familiar musical composition which will be repeatedly played over and over as the vehicle moves along the endless path along which the elements 10 are arranged.

I claim:

1. A musical toy comprising a plurality of sound-producing elements capable of producing musical tones when struck, support means supporting said elements in a predetermined sequence along a given path for producing a predetermined combination of musical sounds when said elements are struck in said sequence in which they are arranged along said path, guide means coextensive with said path, moving means guided by said guide means for movement along said path, and striking means carried by said moving means for striking said sound-producing elements in said sequence as said moving means is guided by said guide means along said path, so as to produce said predetermined combination of musical tones during movement of said moving means along said path, wherein said moving means is a toy vehicle and said guide means is in the form of a track guiding said vehicle for movement along said path, drive means operatively connected to said toy vehicle for driving the latter along said path, and said striking means being operatively connected to said drive means to be driven thereby simultaneously with the movement of said toy vehicle along said track, wherein said striking means includes a rotary carrier rotated by said drive means, a pin carried by said carrier for rotation with the latter, said pin describing a circle during rotation with said drive means, and a striking ring loosely mounted on said pin and successively engaging said sound-producing elements as said vehicle moves along said path.

2. A toy as recited in claim 1 and wherein said carrier includes an elongated arm driven by said drive means about an axis situated between the ends of said arm, a pair of said pins carried by said arm at substantially equal distances from said axis and uniformly distributed thereabout at an angular distance of 180° from each other, and a pair of said rings respectively loosely mounted on said pins for successively engaging said sound-producing elements as said vehicle moves along said track.

3. A toy as recited in claim 2 and wherein said support means is in the form of a plurality of segmented sections of a circle arranged in end-to-end relation to form a complete circle, said musical sound-producing elements extending substantially radially with respect to the center of said circle and being carried by said support means in a row arranged along said circle, said guide means taking the form of a track extending along said circle over said elements and carried by said support means and said toy vehicle moving along said track and carrying said striking means for striking said elements as said vehicle moves along said track.

4. A toy as recited in claim 3 and wherein said support means carries a plurality of upwardly directed pins and said sound-producing elements are elongated and simulate railroad ties, said elements being formed with openings through which said pins extend for removably mounting said elements on said support means, and said track including a pair of rail-simulating elements extending along concentric circles over said elongated tie-simulating sound-producing elements.

5. An xylophone toy comprising a track, said track comprising a first and second mounting beam, said beams extending in parallel disposition, a track suspended over each of said mounting beams, pins located along said mounting beams to receive tone bars positioned thereon so that said tone bars extend substantially transversely of said track, being positioned under said tracks, a resilient member extending along said beams upon which at least the edges of said tone bars rest for separation of said tone bars from said mounting beams, a wheeled vehicle adapted to run along said tracks, and a striking hammer carried by said wheeled vehicle to sequentially strike said tone bars as said wheeled vehicle progresses along said track, said track comprises a plurality of track sections releasably coupled together to form said track.